(12) United States Patent
Ridgeway et al.

(10) Patent No.: US 9,312,548 B2
(45) Date of Patent: Apr. 12, 2016

(54) FUEL CELL PLATE BONDING METHOD AND ARRANGEMENT

(75) Inventors: Kristoffer Ridgeway, Simsbury, CT (US); Christopher John Carnevale, Vernon, CT (US); Michael D. Harrington, Burlington, MA (US)

(73) Assignee: Audi AG, Ingolstadt (DE)

( * ) Notice: Subject to any disclaimer, the term of this patent is extended or adjusted under 35 U.S.C. 154(b) by 233 days.

(21) Appl. No.: 14/003,807

(22) PCT Filed: Mar. 15, 2011

(86) PCT No.: PCT/US2011/028424
§ 371 (c)(1),
(2), (4) Date: Sep. 8, 2013

(87) PCT Pub. No.: WO2012/125153
PCT Pub. Date: Sep. 20, 2012

(65) Prior Publication Data
US 2013/0344418 A1    Dec. 26, 2013

(51) Int. Cl.
*H01M 8/02*    (2006.01)
*H01M 8/24*    (2006.01)
*B29C 45/14*    (2006.01)
*H01M 8/10*    (2006.01)
*B29L 31/34*    (2006.01)
*B29L 31/26*    (2006.01)

(52) U.S. Cl.
CPC ....... *H01M 8/0271* (2013.01); *B29C 45/14336* (2013.01); *B29C 45/14467* (2013.01); *H01M 8/0284* (2013.01); *H01M 8/0286* (2013.01); *H01M 8/242* (2013.01); *H01M 8/247* (2013.01); *B29L 2031/265* (2013.01); *B29L 2031/3468* (2013.01); *H01M 2008/1095* (2013.01); *Y02E 60/50* (2013.01)

(58) Field of Classification Search
CPC H01M 8/0284; H01M 8/0286; H01M 8/0271
See application file for complete search history.

(56) References Cited

U.S. PATENT DOCUMENTS

| | | | |
|---|---|---|---|
| 5,643,390 | A | 7/1997 | Don et al. |
| 5,667,881 | A | 9/1997 | Rasmussen et al. |
| 6,399,234 | B2 | 6/2002 | Bonk et al. |
| 7,311,990 | B2 | 12/2007 | Debe et al. |
| 7,455,701 | B2 | 11/2008 | Muller |
| 8,105,725 | B2 | 1/2012 | Geiss |

(Continued)

FOREIGN PATENT DOCUMENTS

| | | |
|---|---|---|
| EP | 1320142 | 6/2003 |
| EP | 1403951 | 3/2004 |

(Continued)

OTHER PUBLICATIONS

Extended European Search Report, mailed Aug. 11, 2014, for corresponding European Application No. 11860823.1-1360 / 2686902, 6 pages.

(Continued)

*Primary Examiner* — Stewart Fraser
(74) *Attorney, Agent, or Firm* — Seed IP Law Group PLLC

(57) ABSTRACT

An example method of securing a bond film to a fuel cell component includes positioning the bond film adjacent the fuel cell component and melting the bond film using thermal energy from an injection molded seal.

13 Claims, 6 Drawing Sheets

(56) References Cited

U.S. PATENT DOCUMENTS

| | | | |
|---|---|---|---|
| 2004/0161653 A1* | 8/2004 | Andrews | H01M 8/0206 429/434 |
| 2004/0180255 A1 | 9/2004 | Maus et al. | |
| 2004/0216832 A1 | 11/2004 | Mercuri | |
| 2005/0031935 A1 | 2/2005 | Dave | |
| 2007/0190400 A1* | 8/2007 | Buche | H01M 4/8605 429/483 |
| 2008/0199760 A1 | 8/2008 | Heystek | |
| 2008/0289755 A1* | 11/2008 | Burdzy | H01M 8/0273 156/275.7 |
| 2009/0004551 A1* | 1/2009 | Burdzy | H01M 8/0267 429/514 |
| 2009/0142641 A1 | 6/2009 | Morimoto et al. | |
| 2009/0291343 A1* | 11/2009 | Geiss | H01M 8/0202 429/483 |
| 2010/0173206 A1 | 7/2010 | Wang Chen | |

FOREIGN PATENT DOCUMENTS

| | | |
|---|---|---|
| JP | 2001338673 | 12/2001 |
| JP | 2008-226722 A | 9/2008 |
| JP | 2009-543306 A | 12/2009 |
| WO | 2005/020356 A1 | 3/2005 |
| WO | 2007/084472 A2 | 7/2007 |
| WO | 2008006435 | 1/2008 |
| WO | 2010/082934 A1 | 7/2010 |

OTHER PUBLICATIONS

International Search Report and Written Opinion for International Application No. PCT/US2011/028424 dated Nov. 30, 2011.

International Preliminary Report on Patentability for International Application No. PCT/US2011/028424 dated Sep. 26, 2013.

* cited by examiner

FUEL CELL PLATE BONDING METHOD AND ARRANGEMENT

CROSS-REFERENCE TO RELATED APPLICATIONS

This application is the U.S. national phase of PCT/US2011/028424, filed Mar. 15, 2011.

TECHNICAL FIELD

This disclosure relates generally to fuel cells and, more particularly, to securing and sealing a fuel cell plate relative to another fuel cell plate.

DESCRIPTION OF THE RELATED ART

Fuel cell stack assemblies (CSAs) are well known and typically include multiple individual fuel cells. The individual fuel cells include components, such as a unitized electrode assembly (UEA) having a polymer electrolyte membrane (PEM).

The individual fuel cells typically include a bipolar plate on an anode side of the UEA and another bipolar plate on a cathode side of the UEA. The bipolar plates establish conduits that communicate fuel and oxidant to the UEA. The fuel cells utilize fuel and oxidant to generate electric energy in a known manner. Some CSAs use elastomeric seals to control the flow of fuel and oxidant.

SUMMARY

An example method of securing a bond film to a fuel cell component includes positioning the bond film adjacent the fuel cell component and melting the bond film using thermal energy from an injection molded seal.

An example fuel cell component arrangement includes a fuel cell plate. An injection molded seal is on one side of the fuel cell plate. The injection molded seal has a sealing surface that seals an interface between the fuel cell plate and another fuel cell component. A bond film configured to be secured to another side of the fuel cell plate that is opposite the injection molded seal. Thermal energy from the injection molded seal melts the bond film.

An example fuel cell assembly includes an anode plate and a cathode plate arranged in a stacked relationship. A bond film configured to secure the anode plate to the cathode plate. An injection molded seal is positioned near the anode plate, the cathode plate, or both. The injection molded seal has a sealing surface that is configured to seal against another fuel cell component.

Various features and advantages will become apparent to those skilled in the art from the following detailed description. The drawings that accompany the detailed description can be briefly described as follows.

DETAILED DESCRIPTION

Figure 1:
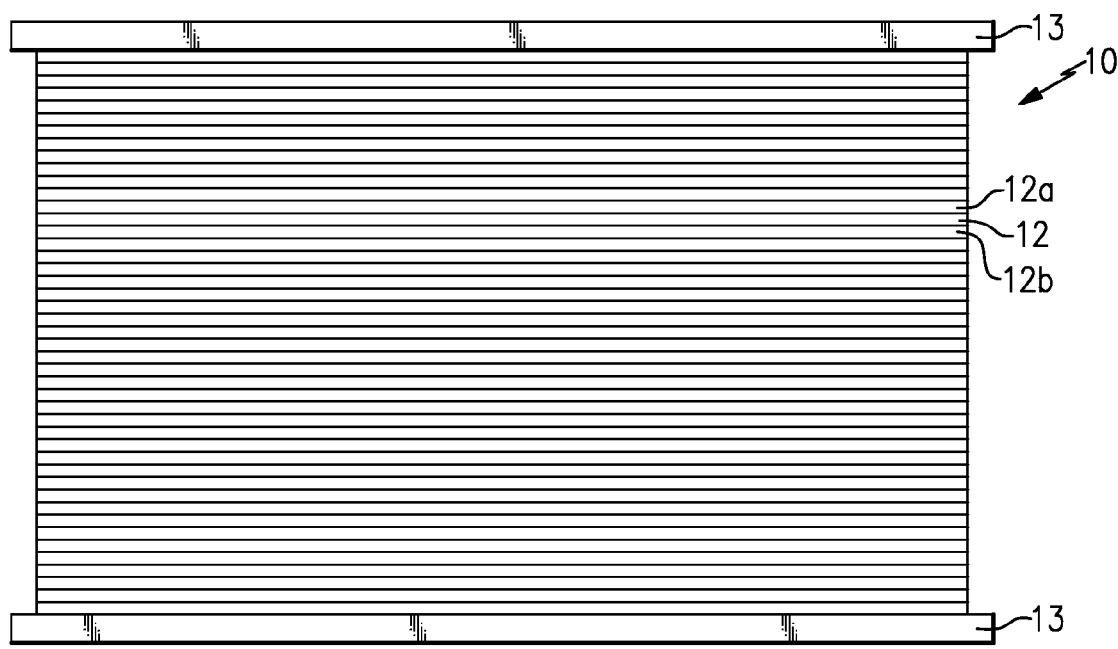
FIG. 1 shows a schematic view of an example cell stack assembly.
Figure 2:
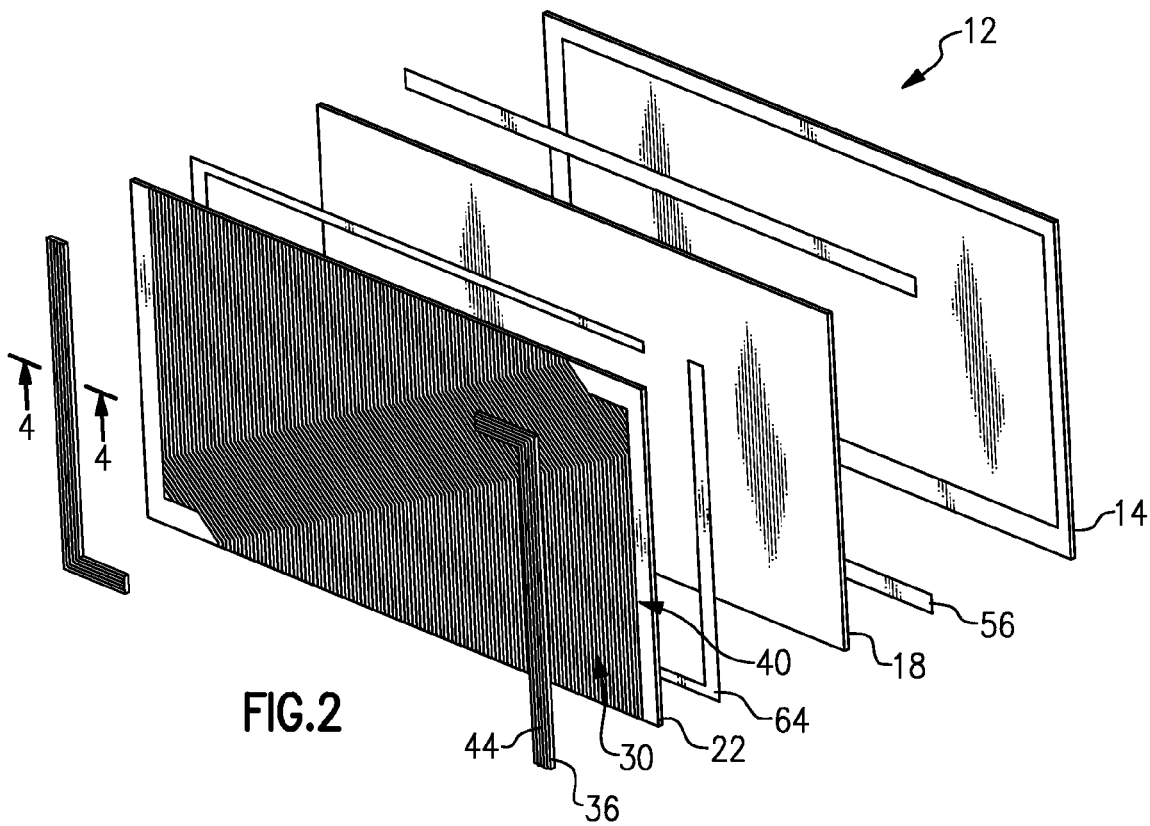
FIG. 2 shows an exploded front view of a fuel cell within the FIG. 1 cell stack assembly.

Referring to FIGS. 1-5, an example fuel cell stack assembly (CSA) 10 includes a fuel cell 12 arranged in a stacked relationship with a plurality of other fuel cells 12a and 12b. In this example, pressure plates 13 clamp the fuel cells 12-12b within the CSA 10. Bolts (not shown) are used in one example to apply the clamping force to the fuel cells of the CSA 10.

The example fuel cell 12 includes a unitized electrode assembly (UEA) 14 having a polymer electrolyte membrane (PEM). The UEA 14 provides electrical energy in a known manner when supplied with a fuel and an oxidant.

The example fuel cell 12 includes bipolar plates, such as a fuel plate 18 and a cathode plate 22 that supply the UEA 14 with fuel and oxidant in fluid forms. Other fuel cells may include other types of fuel cell fluid plates, and components.

In this example, the fuel plate 18 establishes multiple fuel channels 26 configured to deliver fuel, such as hydrogen, to the UEA 14. The fuel plate 18 is referred to as an anode plate in some examples.

In this example, one side of the cathode plate 22 establishes oxidant channels 30 configured to deliver oxidant, such as air, to a UEA of the fuel cell 12a. An opposing side of the cathode plate 22 establishes coolant channels 34 configured to communicate a coolant across the fuel plate 18 the coolant carries thermal energy from the fuel cell 12. The cathode plate 22 is referred to as a cathode plate in some examples.

The example fuel cell 12 includes a seal assembly 36 that extends away from the oxidant channel side of the cathode plate 22 to contact the UEA of the fuel cell 12a. The seal assembly 36 includes a portion held within a recess 40 established within the plate 22. The example seal assembly 36 is a thermoset elastomeric seal, such as an injection molded FKM thermoset elastomer interfacial seal. The seal assembly 36 includes two separate L-shaped portions.

The seal 36 includes a contact face 48 that directly contacts a downwardly facing surface of the UEA of the fuel cell 12a when the fuel cell 12a is stacked on top of the fuel cell 12 within the CSA 10. In this example, the contact face 48 includes four raised protrusions 52 that directly contact the UEA of the fuel cell 12a.

The example seal assembly 36 is limits movement of fuel cell fluids, such as the oxidant, from the CSA 10 when arranged in a stacked relationship with the fuel cell 12a.

The example CSA 10 is externally manifolded. That is, a plurality of external manifolds 54 are used to deliver fuel, oxidant, and coolant to the fuel cells 12 within the CSA 10. In another example, the CSA 10 is an internally manifolded CSA.

The example fuel cell 12 includes strips of bond film 56 that secure the fuel channel side of the plate 18 to the UEA 14. The bond film 56 also seals the interface between the plate 18 and the UEA 14 to limit flow of fuel cell fluids from the CSA 10. The strips of bond film 56 are I-shaped in this example, and positioned along the outer lateral edges of the CSA 10.

The example fuel cell 12 also includes strips of bond film 64 that secure the plate 18 relative to the plate 22. The bond film 64 also seals the interface between the plate 18 and the plate 22 to limit movement of fuel cell fluids from the CSA 10. The strips of bond film 64 are L-shaped in this example, and positioned along the outer lateral edges of the CSA 10.

The example bond films 56 and 64 are thermoplastic elastomers, such as DYNEON THV™ or general purpose thermal plastic film such as polyethylene. Increasing the temperature of the bond films 56 and 64 melts portions of the bond films 56 and 64. The melted portions cure to secure components contacting the bond films 56 and 64.

Figure 3:
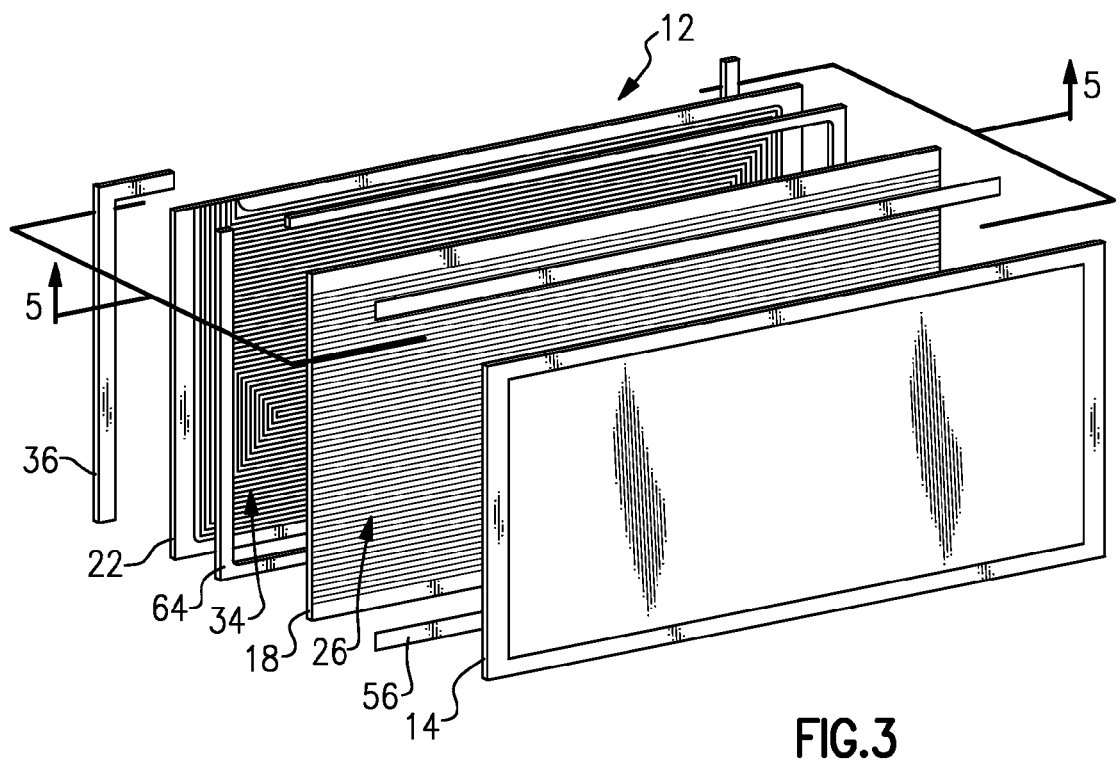
FIG. 3 shows an exploded back view of the FIG. 2 fuel cell.
Figure 5:
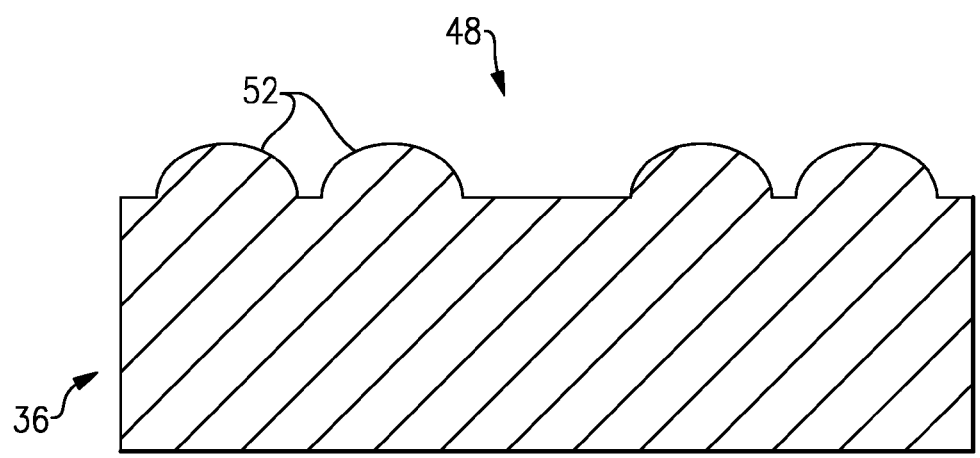
FIG. 5 is a sectional view taken at line 4-4 of FIG. 2.
Figure 4:
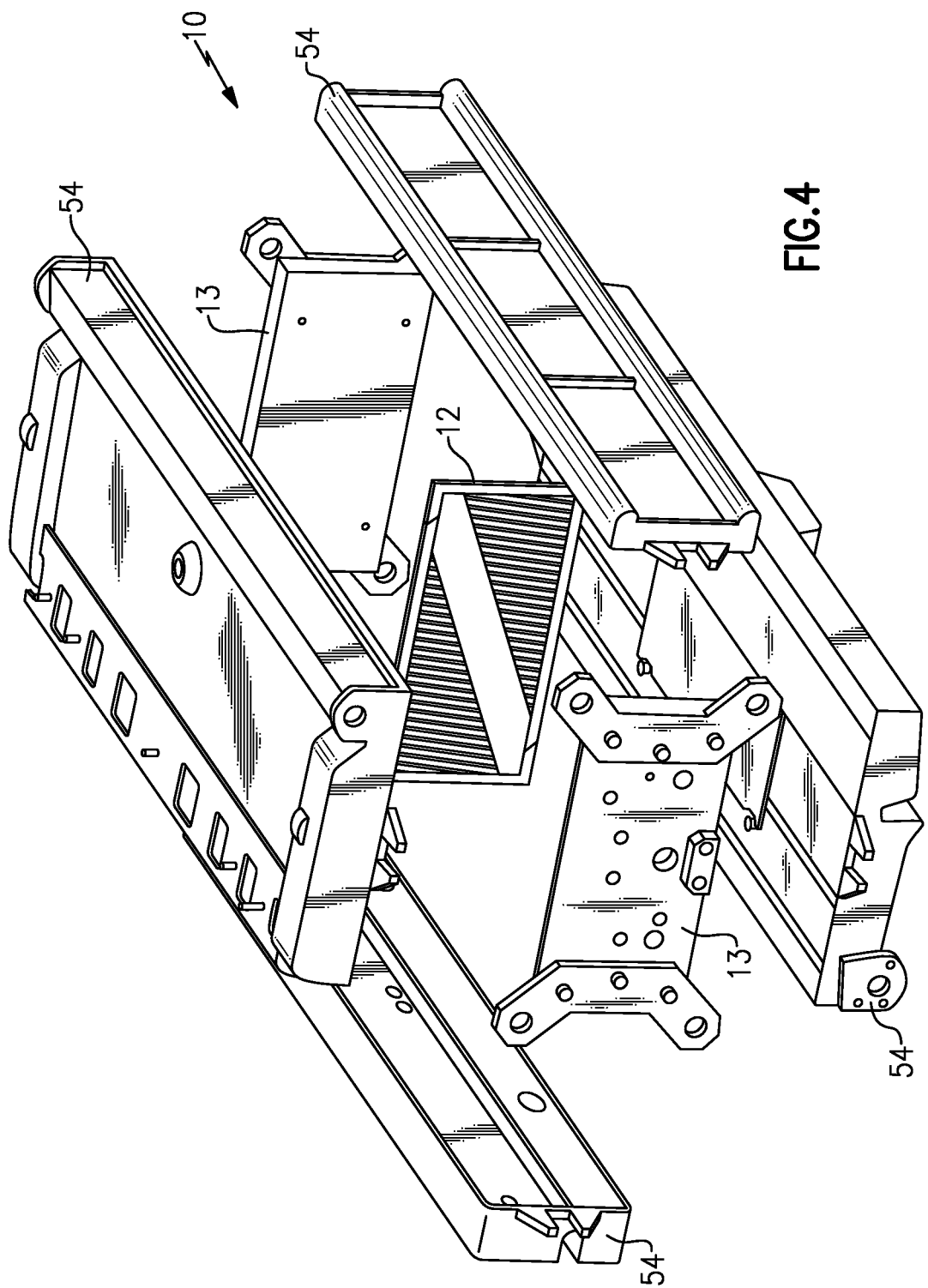
FIG. 4 shows an exploded view of manifolds for use with the FIG. 1 cell stack assembly.
Figure 6:
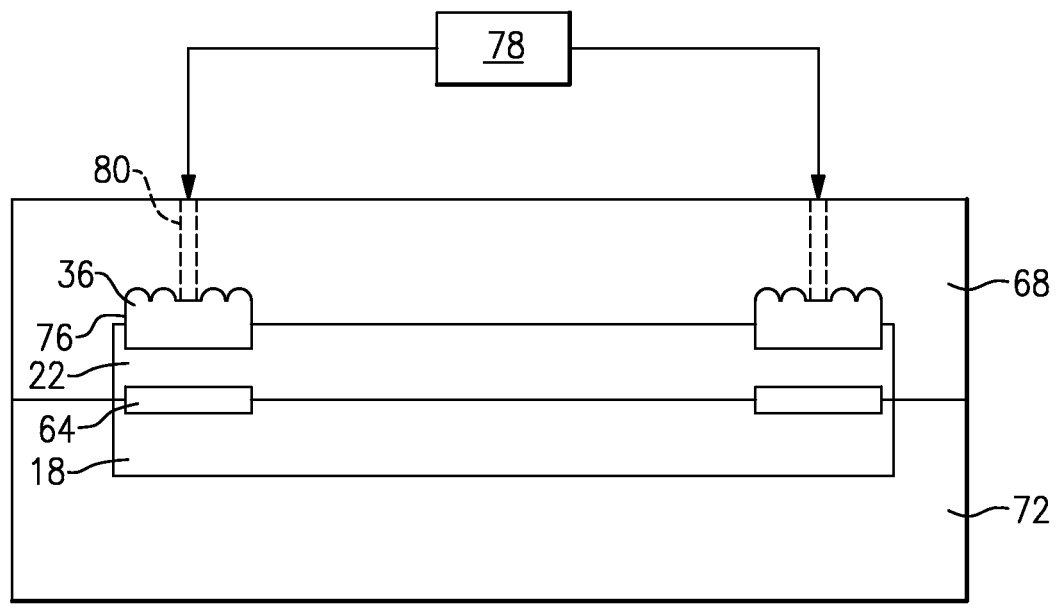
FIG. 6 is a sectional view taken at line 5-5 of FIG. 3 showing selected, not-to-scale portions of the FIG. 2 fuel cell within a mold.

Referring now to FIG. 6 with continuing reference to FIG. 3, an upper mold 68 and a lower mold 72 are configured to hold the plate 22, the bond film 64, and the plate 18. The upper mold 68 and the recess 40 define cavities 76. Liquid material, which is an elastomer in this example, is injected from a material supply 78 into the cavities 76 through at least one sprue 80. The liquid material hardens in the cavity 76 to form the seal 36.

The example bond film 64 is held between the plate 22 and the plate 18 during the injection molding. Some of the thermal energy moves from the seal 36, through the plate 22, to the bond film 64. The thermal energy melts the bond film 64, which then cools and cures to hold the plate 22 relative to the plate 18. Curing the bond film 64 using thermal energy from the injection molding unitizes portions of the fuel cell 12 in a single injection molding step.

In this example, injection molding the liquid material into the cavities 76 forces the plate 22 downward toward the plate 18. As can be appreciated, this pressure from the injection molding may improve the bonding of the plate 22 to the plate 18.

Figure 7:
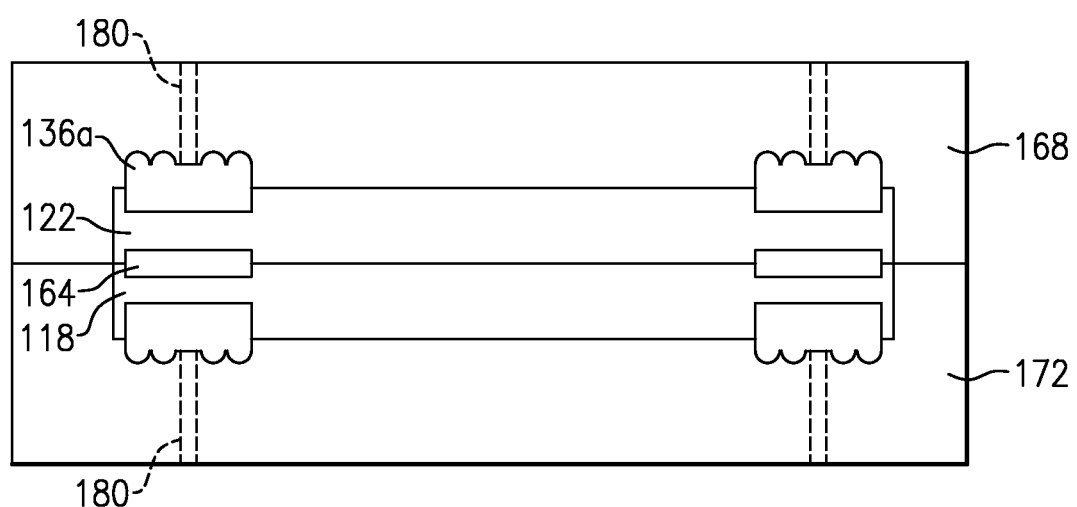
FIG. 7 is a sectional view showing selected portions of another example fuel cell within a mold.

Referring to FIG. 7, in another example, an upwardly directed seal 136a is injection molded adjacent a plate 122, and a downwardly directed seal 136b is injection molded adjacent a plate 118. In this example, an upper mold 168 and a lower mold 172 each include at least one sprue 180.

Also, in this example, thermal energy from one or both of the seals 136a-136b moves to a bond film 164 to melt the bond film 164, which then cools and cures to secure the plate 122 relative to the plate 118. The injection molding pressures may improve the bonding of the plate 122 to the plate 118 by compressing the bond film 164 during the melting and curing.

Figure 8:
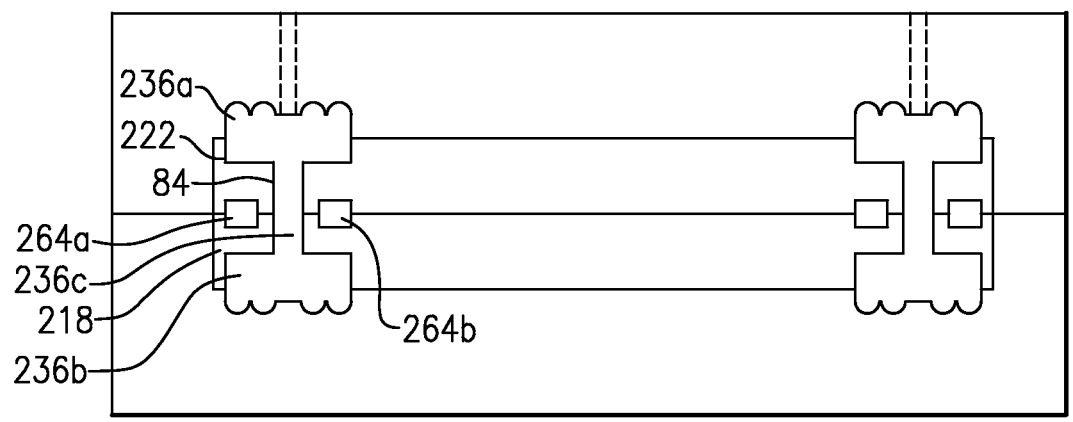
FIG. 8 is a sectional view showing selected portions of yet another example fuel cell within a mold.

Referring to FIG. 8, in yet another example, a seal includes an upwardly facing seal portion 236a and a downwardly facing seal portion 236b. A plate 222 and a plate 218 each establish portions of an aperture 84 that communicates liquid material to the seal portion 236b during the injection molding. A connecting portion 236c of the seal solidifies within the aperture 84 and connects the upwardly facing seal portion 236a and the downwardly facing seal portion 236b.

In this example, thermal energy from one or more of the portions 236a, 236b, and 236c moves to an inner bond film portion 264a and an outer bond film portion 264b. The thermal energy melts the bond film portions 264a and 264b, which then cools and cures to secure the plate 222 to the plate 218. The injection molding pressures may improve the bonding of the plate 222 to the plate 218 by compressing the bond film portions 264a and 264b during the melting and curing.

Notably, in this example, the upwardly facing seal portion 236a and the downwardly facing seal portion 236b are radially enlarged relative to the connecting portion 236c of the seal. Thus, as can be appreciated, the seal 236a-236c and the bond film 264a-264b both limit relative movement between the plate 222 and the plate 218.

Figure 9:
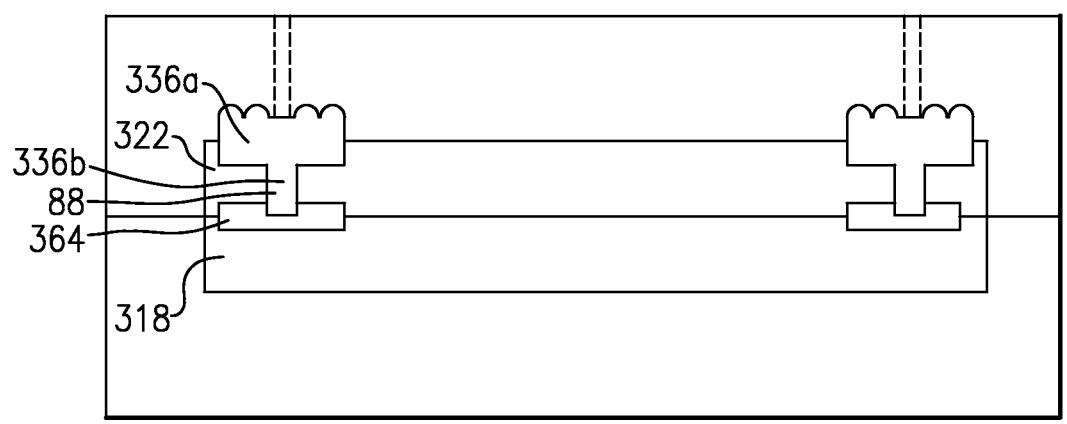
FIG. 9 is a sectional view showing selected portions of yet another example fuel cell within a mold.

Referring now to FIG. 9, in yet another example, a seal includes an upwardly facing seal portion 336a and an extension 336b. A plate 322 establishes an aperture 88, which holds the liquid material as the extension 336b is cured.

The example extension 336b directly contacts a bond film 364. Some of the thermal energy from one or more of the upwardly facing seal portion 336a and the extension 336b moves to the bond film 364 to melt the bond film 364, which then cools and cures to secure the plate 322 relative to a plate 318. The injection molding pressure exerted by the seal material on the bond film 364 compresses the bond film 364 during the melting and curing, which may improve the bonding of the plate 122 to the plate 118.

Figure 10:
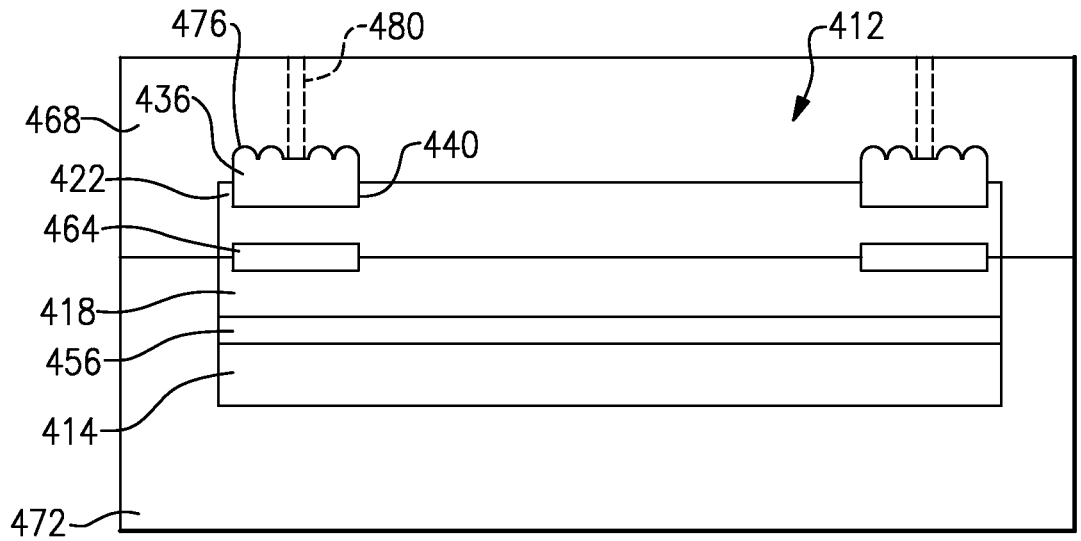
FIG. 10 is a sectional view showing selected portions of yet another example fuel cell within a mold.

Referring to FIG. 10, in yet another example, an upper mold 468 and a lower mold 472 are configured to hold portions of a fuel cell 412, such as a plate 422, a bond film 464, a plate 418, a bond film 456, and a UEA 414. The upper mold 68 and a recess 440 in the upper mold 468 define cavities 476. Liquid material is injected into the cavities 476 through at least one sprue 480. The liquid material hardens in the cavity 476 to form the seal 436.

In this example, thermal energy from the seal 436 melts the bond film 464 and the bond film 456. The bond film 464 cures and holds the plate 422 relative to the plate 418. The bond film 456 cures and holds the plate 418 relative to the UEA 414. Curing the bond film 464 and the bond film 456 during the injection molding of the seal 436 unitizes the fuel cell 412 in a single step. The injection molding pressure exerted by the seal material compresses the bond film 464 and the bond film 456, which may improve the bonds of the bond films 464 and 456.

Figure 11:
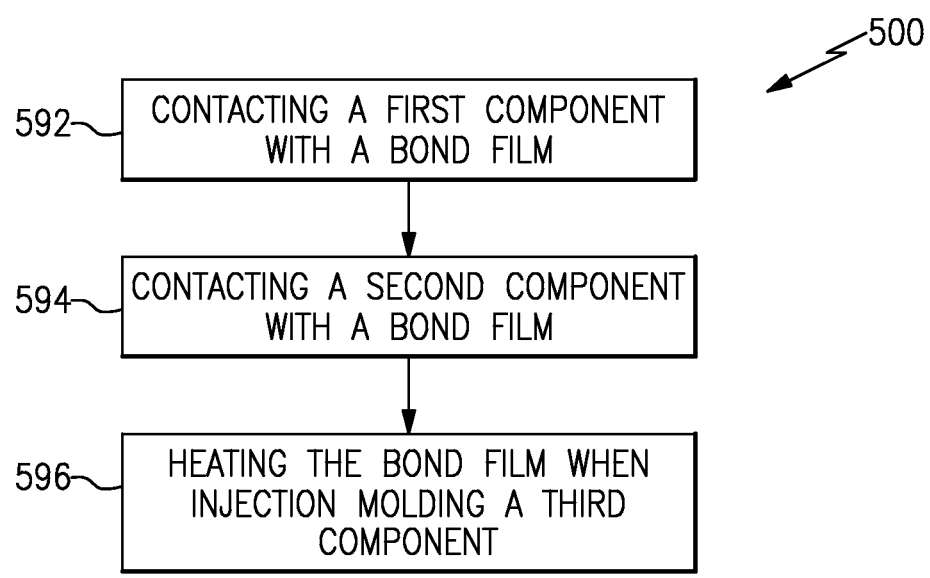
FIG. 11 shows the flow of an example method for securing components of the FIG. 2 fuel cell.

Referring to FIG. 11, an example method 500 for securing a fuel cell component relative to another fuel cell component includes a step 590 of contacting a first component with a bond film at a step 592, and contacting a second component with the bond film at a step 594. The method melts the bond film when injection molding a third component at a step 596. The method 500 may compress the bond film during the molding process. In one example, the temperature required to cure the third component is matched to the melt temperature of the bond film.

The examples of this disclosure describe the thermal energy as moving from the seal to the bond film. A person having skill in this art and the benefit of this disclosure will understand that such a description includes movement of thermal energy from the liquid material (that forms the seal) to the bond film. As can be appreciated, the material of the seal and the bond film could be selected so that the melting temperature of the bond film coincides with the injection molding temperature appropriate for the seal.

Features of the disclosed examples include molding and bonding plates of a fuel cell in a single manufacturing step, which reduces processing and manufacturing time for the application of seals to fuel cell components.

The preceding description is exemplary rather than limiting in nature. Variations and modifications to the disclosed examples may become apparent to those skilled in the art. The scope of legal protection can only be determined by studying the following claims.

We claim:
1. A method, comprising:
 securing a bond film to a first fuel cell component, the securing including:
  forming an injection molding material on a first side of a first fuel cell plate;

positioning the bond film adjacent to a second side of the first fuel cell plate; and sealing an interface between the fuel cell plate and the first fuel cell component with the injection molded material using thermal energy;

melting the bond film with the thermal energy from the sealing.

2. The method of claim 1, further comprising securing the first fuel cell component relative to a second fuel cell component by curing the bond film after the melting.

3. The method of claim 2, wherein the first fuel cell component and the second fuel cell component are second and third fuel cell plates, respectively, and the positioning further includes positioning the bond film between the second and third fuel cell plates.

4. The method of claim 1, further comprising injecting the injection molding material into a mold that holds the bond film and the first fuel cell component.

5. The method of claim 1, further comprising compressing the bond film during the melting.

6. A fuel cell component arrangement, comprising:

a first fuel cell plate;

an injection molded seal on a first side of the first fuel cell plate, the injection molded seal having a sealing surface configured to seal an interface between the first fuel cell plate and another fuel cell component; and a bond film secured to a second side of the first fuel cell plate that is opposite the first side, and secured to a second fuel cell plate, the bond film completely encased between the first fuel cell plate and the second fuel cell plate.

7. The fuel cell component arrangement of claim 6, wherein the injection molded seal is a thermoset elastomeric seal.

8. The fuel cell component arrangement of claim 6, wherein the bond film is a thermoplastic bond seal.

9. The fuel cell component arrangement of claim 6, wherein the bond film secures the fuel cell plate to a unitized electrode assembly.

10. The fuel cell component arrangement of claim 6, wherein the bond film is configured to be cured during the injection molding of the injection molded seal.

11. A fuel cell assembly, comprising:

an anode plate;

a cathode plate arranged in a stacked relationship with the anode plate;

a bond film completely encased between the anode plate and the cathode plate and configured to secure the anode plate to the cathode plate; and an injection molded seal positioned near at least one of the anode plate or the cathode plate, the injection molded seal having a sealing surface configured to contact another fuel cell component.

12. The fuel cell assembly of claim 11, wherein the bond film is configured to be cured during the injection molding of the injection molded seal.

13. The fuel cell assembly of claim 11, wherein the injection molded seal has a curing temperature that is high enough to melt the bond film.

\* \* \* \* \*